United States Patent [19]

Flowers et al.

[11] 4,190,186
[45] Feb. 26, 1980

[54] PREPARATION OF TUBE FOR WELDING

[75] Inventors: Leonard J. Flowers, Oakmont, Pa.; Melvin R. Fahnestock, Parkersburg, W. Va.; James L. MacIntosh, Richmond, Ind.

[73] Assignee: Aluminum Company of America, Pittsburgh, Pa.

[21] Appl. No.: 942,542

[22] Filed: Sep. 15, 1978

[51] Int. Cl.² .................................... B23K 31/06
[52] U.S. Cl. ................................ 228/15.1; 228/18;
228/173 F; 29/33 T; 72/302; 72/342; 219/59.1;
219/105
[58] Field of Search ............... 228/18, 15.1, 173 F;
72/302, 342, 367, 378; 219/59.1, 60 A, 105;
29/33 T

[56] References Cited

U.S. PATENT DOCUMENTS

| 972,928 | 10/1910 | Schneider | 219/105 X |
|---|---|---|---|
| 1,922,913 | 8/1933 | Free et al. | 219/59.1 |
| 2,003,118 | 5/1935 | Mirfield et al. | 219/59.1 X |
| 2,336,524 | 12/1943 | Bannister | 72/302 |
| 3,621,176 | 11/1971 | Valente | 219/105 X |
| 3,765,215 | 10/1973 | Martin | 72/280 |
| 3,912,151 | 10/1975 | Martin et al. | 228/171 |

Primary Examiner—Francis S. Husar
Assistant Examiner—K. J. Ramsey
Attorney, Agent, or Firm—Elroy Strickland

[57] ABSTRACT

Apparatus for preparing two tubes to be welded together at their ends and for placing the ends in opposed, abutting relationship for welding. The apparatus includes means for annealing a portion or length of each tube, and means for stretching the portion or length of each tube for straightening purposes after it is annealed. In addition, the apparatus includes means for severing an end portion of the annealed length of each tube to provide two annealed tube ends for abutting and welding together. Further, the apparatus includes means for forcing the abutting ends of the tubes together in a manner that will upset the material of the tube ends during welding.

7 Claims, 7 Drawing Figures

PREPARATION OF TUBE FOR WELDING

BACKGROUND OF THE INVENTION

The invention relates generally to the preparation of tube end portions for welding together, and particularly to an apparatus that will conveniently prepare the tube portions for welding in a manner that insures a high quality weld for multiple draw purposes, though the invention is not limited thereto.

In U.S. Pat. No. 3,765,215 to Martin there is shown a method and apparatus for drawing tubular stock continuously and simultaneously through at least two successive drawing dies having mandrels located within the stock being drawn. Individual successive capstans are employed to direct the stock to the respective dies and to pull the same from the dies. With such a process and apparatus, simultaneous reduction of the cross sectional area of the stock is effected with a single pass of the stock through the dies and around the capstans.

In U.S. Pat. No. 3,912,151 to Martin et al there is shown a method and apparatus for welding the ends of tubular stock together for the purpose of providing a continuous length of stock for the drawing process described in the first Martin patent. In the second, Martin et al patent the ends are welded together along an interface that is angled, with respect to the axis of the stock, to provide an angular weld that will withstand the severe conditions encountered in the multiple draw process of the first Martin patent. The conditions are severe because the tube and welds are continuously being wrapped around the capstans and pulled from the capstans through the dies at substantial speed such that the forces on the welds are quite severe. The angled weld of the second Martin el al patent provides overlapping portions of the welded tube ends to receive the bending forces exerted by the successive capstans in a gradual manner and to enter the successive dies in a gradual manner thereby avoiding the shock of the complete weld entering the die at one instant of time.

BRIEF SUMMARY OF THE INVENTION

It has now been found that an angled weld is not necessary for the drawing process of the Martin patent, and that the abutting ends of two tubes can be welded along a 90° cut and interface in a manner that provides more than adequate resistance to the bending and pulling forces encountered in simultaneous, multiple draw processes. With each tube end being provided with a 90° cut, such as formed by a rotary saw blade designed to cut metal tubing, and annealed and straightened in the manner presently to be explained, the ends of the tubes can be welded together by a portable orbital welding device, such as the A-1250 unit manufactured by the Astro-Arc Company of Sun Valley, California. Such a device requires straight tube portions with 90° ends to effect a sound weld between the ends, but does not require filler metal (wire feed). Hence, the weld area has minimal volume and therefore is subjected to less stress when physically worked.

The present invention includes a unit and apparatus for receiving the end portion of a tube extending from a processing unit, such as the tube drawing apparatus shown in the above Martin U.S. Pat. No. 3,765,215, and an end portion of a supply of tubing waiting to be processed, the unit and apparatus having a set of clamps for receiving and holding the end portions successively in place for successive annealing and stretching of the portions. A source of electrical current for direct resistive heating of the tube is connected to these clamps, the current source providing sufficient electrical power to heat and anneal each of the tube end portions after they are successively clamped in the annealing clamps. After each clamping and annealing step, one of the clamps is moved relative to the other to stretch the annealed portion of the tube to assure the straightness thereof for the welding process. A saw clamp and two weld clamps now close around the tube, and the anneal clamps opened. The end of the tube is severed from the remaining portion of the annealed length by a cutting device adapted to provide a 90° cut. A similar operation is performed successively on both tubes. After the severing steps, and with the tubes being gripped in the respective weld clamps, the weld clamps are moved to locate the two tubes in axial alignment. The ends of the tubes are then disposed in abutting relationship for welding, one of the weld clamps being laterally movable toward the other. A portable orbital welding device is then located over the intersection of the tube ends and a 390° TIG weld is made around the tube. During the welding process, the laterally movable weld clamp is translated toward the other such that the material at the ends of the tubes is upset to permit a weld of good quality. After the weld, the portable orbital welding device is removed and the weld clamps are opened to release their respective tubes, which are now welded together, such that the processing unit can be restarted to pull the new supply of tube into the processing unit.

Such an annealing, straightening, and tube positioning apparatus is simple to use, and provides a substantial improvement over the welding process and apparatus shown in the above Martin et al patent.

THE DRAWINGS

The invention, along with its objectives and advantages, will be better understood from consideration of the following detailed description and accompanying drawings in which.

PREFERRED EMBODIMENTS OF THE INVENTION

Figure 1:
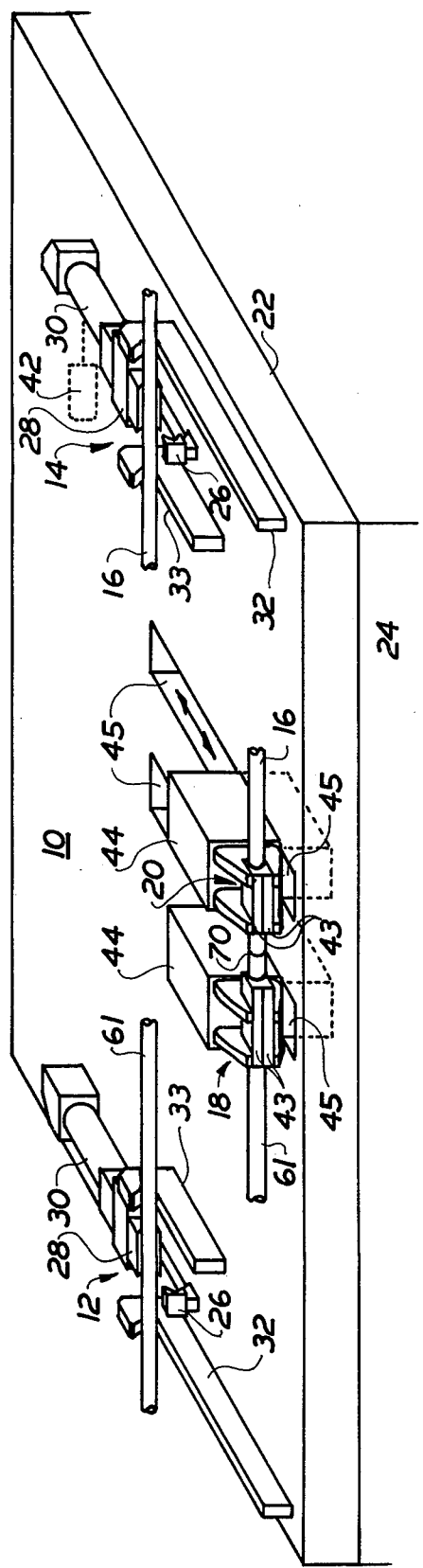
FIG. 1 is a perspective view of four clamping means of the apparatus of the invention.
Figure 2:
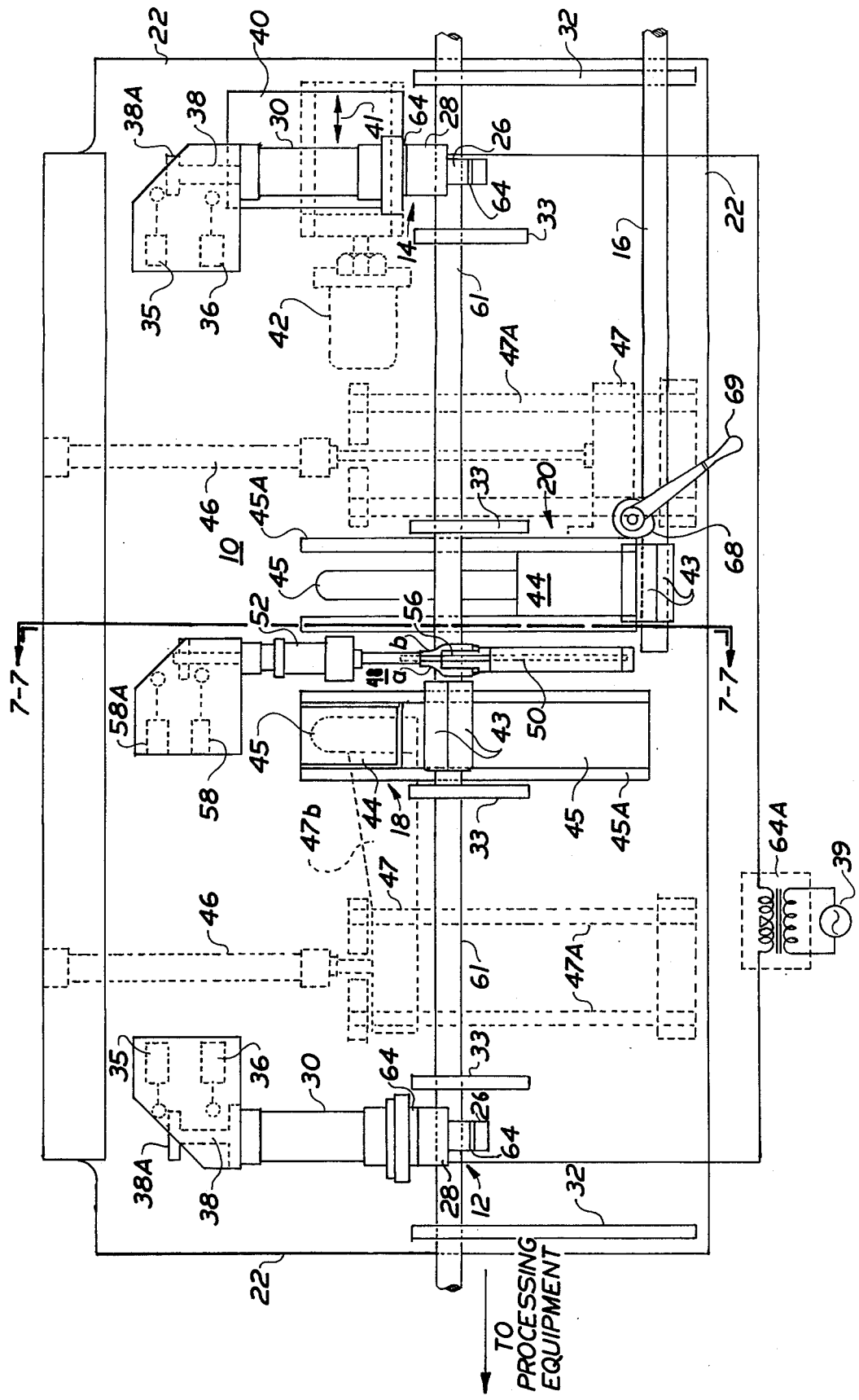
FIG. 2 is a plan view of the apparatus of the invention.

Referring now to FIG. 1 of the drawings, certain components of the apparatus of the invention are shown in perspective, the apparatus being generally designated by reference numeral 10. More particularly, and referring also to FIG. 2 of the drawings, apparatus 10 includes two structures or fixtures 12 and 14 for clamping a length of tube between them. In FIG. 2, such a length of tube is labeled 61, though a tube 16 will also be held by the two clamp structures, as explained hereinafter. In FIG. 1, two additional clamp structures 18 and 20 are clearly seen, such structures being located between clamp structures 12 and 14. These four clamp structures are mounted on the upper surface of a table or bench top 22, which top may be the upper wall of a cabinet structure and bench area 24, only partially and diagrammatically visible in FIGS. 1 and 7.

Clamp structures 12 and 14, hereinafter referred to as anneal clamps, are each comprised of forward and rear jaws 26 and 28 respectively and an associated cylinder 30 connected to move the forward jaw into and out of clamping relationship with the rear jaw, the rear jaw being fixed. Both jaws are constructed of a good electrically conductive material, such as copper. The forward or front jaw 26 of each anneal clamp may also be rotatable about the axis of the actuating cylinder 30 so that the jaw can be positioned out of the plane of opposing jaw 28 to facilitate disposal of a tube in the anneal clamps. Further, each anneal clamp has associated therewith one parallel guide and stop means 32, located on the outside of each anneal clamp, and four "inside" stops 33 (located between the anneal clamps), all of which provide fixed surfaces for receiving and locating a tube, such as 16, in alignment with the clamping area of jaws 26 and 28.

The energizing medium for cylinders 30 may be any appropriate means, such as pressurized air available in manufacturing facilities, though the invention is not limited thereto. For example, the cylinders may be electrical solenoids. In either case, when the forward jaw 26 is moved toward and away from jaw 28, a cam or other suitable mechanism within the cylinder 30, and not visible in the drawings, is employed to rotate 26.

As shown in dash-outline in FIG. 2 of the drawings, at the end of each cylinder 30 are located two limit switches 35 and 36 that are mechanically actuated by movement of a rod 38 and a lateral arm or extension 38A located at the end of each rod. The cylinder used here may be the basic double-ended rod cylinder such as made by the Stilson Division of KMS Industries, Inc. of Roseville, Michigan.

A power supply 39, depicted only diagrammatically in FIG. 2, is connectable between anneal clamps 12 and 14 for purposes discussed below.

For purposes presently to be discussed, the left anneal clamp 12 is shown laterally fixed on table surface 22, while the right anneal clamp 14, along with its cylinder 30 and limit switches, is shown laterally translatable in a slot 40 provided in table 22, as shown in FIG. 2. Arrow 41 in FIG. 2 indicates the direction of this movement of clamp 14, such movement being effected and automated, as indicated in FIGS. 1 and 2, by use of a cylinder 42, which cylinder is shown in dash-outline, and is preferably located beneath table top 22.

The second set of clamp fixtures 18 and 20, hereinafter referred to as weld clamps, are designed to respectively grip the ends of two tubes for welding purposes when the jaws 43 thereof are closed on the tubes by actuation of cylinders 44, discussed in detail below. The weld clamps and cylinders are mounted on table top 22 in a manner that permits their translation along the axes of cylinder 44 and thus in rearward and forward directions on table 22. These clamp fixtures are thus respectively mounted in two, parallel, elongated channels or openings 45 provided in the table top, and include two parallel plates 45A located on opposed sides of cylinder 44, as shown in FIG. 2. Two cylinders 46, as diagrammatically represented in dash-outline in FIG. 2, and preferably located beneath the table top, are mounted in a manner that translates the weld clamps in their respective channels. Because of the congestion of components in the area immediately beneath the weld clamps, each cylinder 46 is located to one side and to the rear of its respective weld clamp. Cylinders 46 are mechanically connected to their respective clamps by a carriage means 47 mounted on parallel rods 47A and an extension 47B (all in dash-outline in FIG. 2) of the carriage being connected to the clamp beneath table top 22.

The cylinders, limit switches and other electrical components employed in the apparatus of the invention are commercially available. For example, cylinder 42 may be an air cylinder made by the Bellofram Corporation of Burlington, Massachusetts. Similarly, pneumatic and electrical interconnections can be made in a variety of ways, which do not form a part of the invention.

Figure 7:
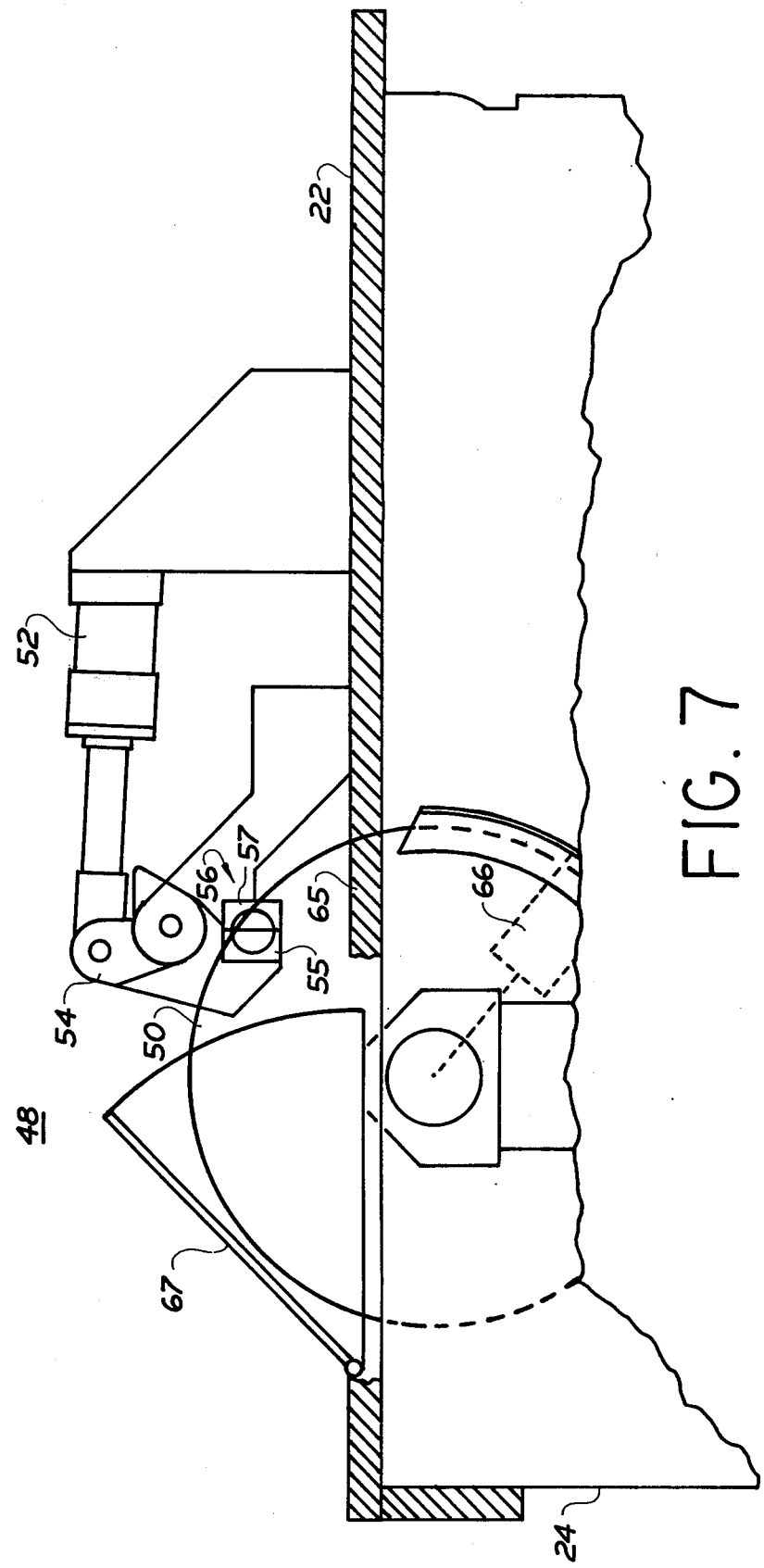
FIG. 7 is a partial view of a mechanism for cutting the tubing shown in the figures, the view taken along section line 7—7 of FIG. 2.

Between channels 45, and the weld clamps mounted therein, and generally centered between the channels and weld clamps, as shown in FIG. 2, is a means 48 for cutting straight through a metal tube to provide the same with a square, 90° cut end. As shown in FIG. 7, 48 includes a circular blade 50, driven by a suitable motor not shown, a clamp actuating cylinder 52, and a knuckle device 54 connecting a movable jaw 55 of a clamp 56 to the cylinder. 54 provides double articulation of jaw 55 in the process of clamping and declamping tube for the cutting process.

Clamp 56 includes a fixed jaw 57 opposed to movable jaw 55. As indicated in the plan view of FIG. 2, the jaws of clamp 56 are divided into left and right-hand portions a and b, and spaced apart, such that blade 50 is permitted to pass between the divided portions in the process of cutting the tube clamped by 55 and 57. Clamp jaws 55 and 57 are effective to accurately round the tube ends if the ends are out-of-round.

Figure 3:
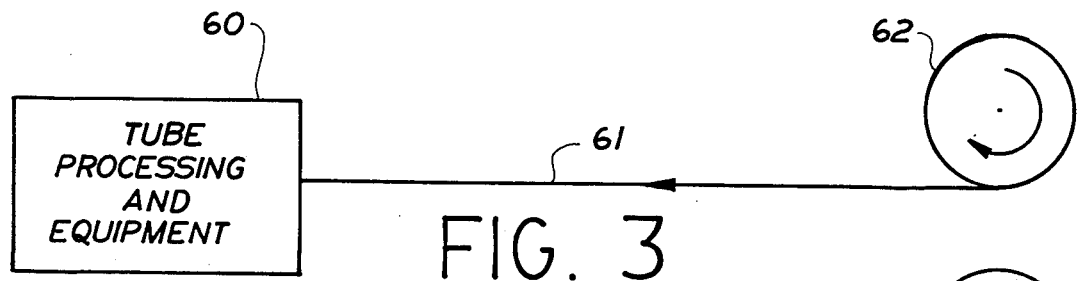
FIG. 3 is a schematic representation of a supply of tubing being directed to equipment in which the tubing is processed.
Figure 4:
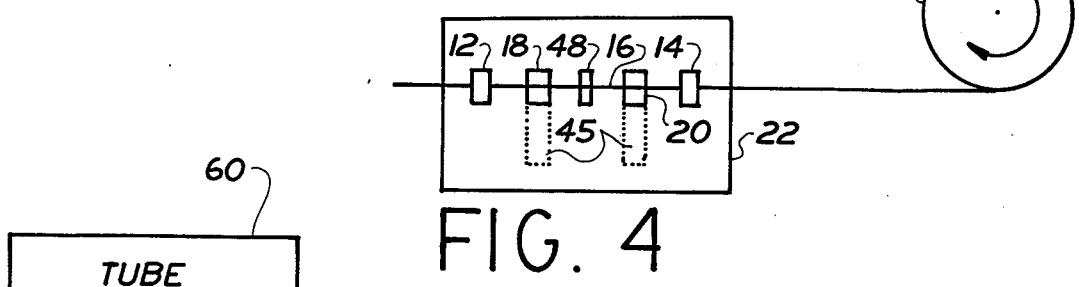
FIG. 4 is a schematic representation of the apparatus of FIGS. 1 and 2 containing an end portion of tubing unwound from a supply thereof.
Figure 5:
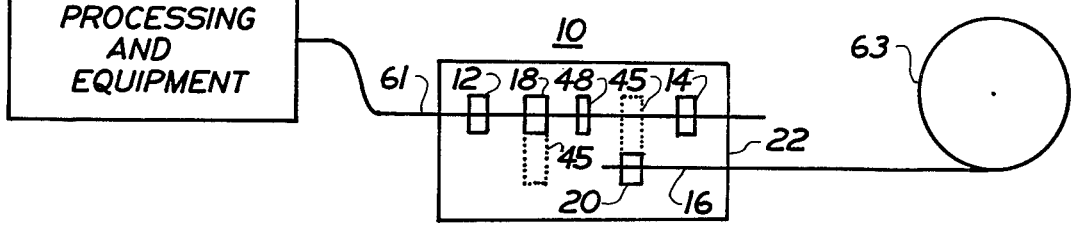
FIG. 5 is a schematic view of the apparatus of FIGS. 1 and 2 containing an end portion of the tubing extending from the processing equipment of FIG. 3, as well as the end of the tubing of FIG. 4.
Figure 6:
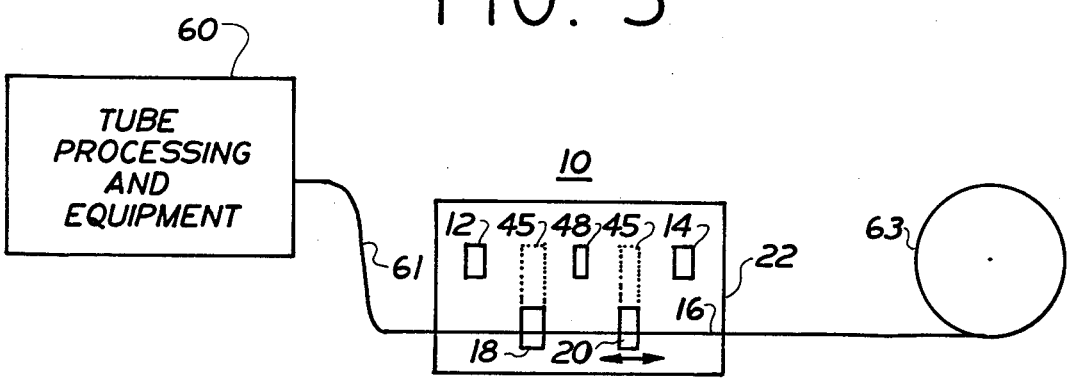
FIG. 6 is a schematic representation of the apparatus of FIGS. 1 and 2 containing the two end portions of the tubing of FIG. 5 aligned for welding.

FIGS. 4 to 6 of the drawings show diagrammatically the use of the apparatus of FIGS. 1, 2 and 7 at a location in which metal tubing 61 is being processed by equipment generally labeled 60, as shown in FIG. 3. 60 may be the continuous tube drawing process and apparatus disclosed in U.S. Pat. No. 3,765,215 to Martin discussed earlier, though the present invention can, of course, be employed in connection with other processes and apparatus. The tubing is continuously paid off to 60 from a coil supply 62 thereof. When the supply of tubing 62 runs out, a second supply, such as 63 in FIG. 4, is required to be ready to feed 60 and thus continue utilization of the equipment and process of 60. This, however, requires either that the operation of the apparatus of 60 be stopped and threaded anew, with the tubing of supply 63, or that the forward end of 63 be joined to the trailing end of tube 61 so that 61 can be employed to pull the tube of 63 into and thereby thread the apparatus of 60 with the tube of 63 when 60 is restarted. The purpose of apparatus 10 of the invention is to prepare such tube ends for welding together so that the process of 60 can quickly be restarted using the new supply of tube from tubing 63 welded to the trailing end of tube 61. To this end, the tube end provided by the fresh supply (63) is unwound from the coil thereof and taken to apparatus 10 in the manner shown in FIG. 4 of the drawings. This section or length of tube is labeled 16 in FIGS. 1 and 2 and in FIGS. 4 through 6.

More particularly, an end section or length of tube 16 from 63 is disposed against the surfaces of stops 32 and 33 and the rear jaws 28 of anneal clamps 12 and 14, which components are not shown in FIGS. 4 to 6. With tube length 16 so disposed, an operator of apparatus 10 operates a switch (not shown) that causes an energizing medium, such as plant air, to be directed to cylinders 30 of the anneal clamps. Cylinders 30 cause rotation of front jaws 26 of the anneal clamps to the position shown in FIG. 1, as mentioned earlier, and then close jaws 26 on the tube and against rear jaws 28, as seen in FIG. 2. When this occurs, limit switches 35 are closed, at the rear of each cylinder 30, by movement of cylinder rods 38 and their extensions 38A, and limit switches 36 are opened to disable the circuit of the saw motor (now shown), as a safety measure. The closing of switches 35 enables electrical current to be applied to clamps 12 and 14 from source 39. This can be accomplished by closing the circuit of the primary winding of a transformer 64A (only diagrammatically shown in FIG. 2), the primary being connected across power supply 39, while the secondary of the transformer is connected between clamps 12 and 14. The primary, of course, energizes the secondary and electrical current is thereby directed to the tube length 16 extending between the clamps, the current flowing through the tube length between the jaws of the clamps and back to the secondary winding. The amount of this current is such that it will quickly heat the metal of the tube length between clamps 12 and 14 to a temperature level that anneals the metal. The jaws 26 and 28 of clamps 12 and 14 are electrically insulated from the rest of the clamp structure, as indicated at 64, in FIG. 2, to limit the flow of the anneal current to the length of tube extending between 12 and 14.

In annealing the length of tubing, the length expands longitudinally. To permit this expansion and to insure straight tube length for welding, the right anneal clamp 14 (and cylinder 30 with its switches 35 and 36) is moved laterally to the right, in opening 40 provided in table 22, by activation of cylinder 42, this movement providing a certain stretching of the tube length. An adjustable stop means (not shown) can be used to limit lateral movement of the clamp to provide a controlled amount of stretching.

The operation of cylinder 42 and the cessation of electrical current can be effected automatically by a control unit (not shown), the unit being designed to signal the operation of 42 and 39 at a time ($I^2R$) sufficient to allow proper anneal of the tube length, "I" being the anneal current and "R" representing the electrical resistance of the length of tubing gripped between clamps 12 and 14. Such control units may be fabricated from commercially available electrical components.

When clamp 14 is translated to the right, tube length 16 is stretched and straightened for welding purposes, as explained further hereinafter.

With the completion of the anneal and stretch cycle, the weld clamps 18 and 20, and saw clamp 56 are closed on 16 at the rearward position of weld clamps 18 and 20. This can be accomplished by the above control unit, the unit initiating actuation of respective cylinders 44 and 52. When the saw clamp closes, cylinder 52 operates limit switch 58 (in the manner of cylinders 30) which signals for the opening of anneal clamps 12 and 14, and the rotation of forward jaws 26 of the anneal clamps to a position that permits tube 16 to be removed from the anneal clamps. With the anneal clamps open, limit switches 35 are operated by rod extensions 38A to disable the anneal circuit of supply 39 as a safety measure. In addition, the right anneal clamp is now moved by cylinder 42 so as to return to its original lateral position to await the straightening of another length of tube.

Tube length 16 is now in the grip of jaws 43 of the weld clamps 18 and 20 and jaws 55, 57 of saw clamp 56. The operator of apparatus 10 proceeds to operate a "saw on" switch (not shown) which turns on the saw motor and activates a cylinder 66 (in dash-outline in FIG. 7). 66 begins raising blade 50 through a slot 65 in table top 22 and between the divided clamp 56 to cut the end of annealed tube 16, the blade providing a square, 90°0 cut across the diameter of the tube. At the completion of the cut, the saw reaches a predetermined position in relation to the tube such that another limit switch (not shown) can now signal for return of the saw to its original position under table top 22.

When the saw 50 returns to its original position another limit switch (not shown) is operated which turns off the motor of the saw and initiates the opening of saw clamp 56. The saw clamp cylinder 52 now operates limit switch 58A (FIG. 2) which enables (by closing an appropriate circuit) the sequence of operations to proceed.

A guard door 67, as shown in FIG. 7, is shown hinged and positioned to be raised and lowered with blade 50, and cover any opening in table top 22 that is required to permit the apparatus of 50 to pass through 22 in the process of cutting tube.

With the saw clamp 56 open, and the left section (stub) of tube 16 severed from the right, remaining section in FIG. 4, the operator orders the release of the left weld clamp 18 so that the left section or stub can be disposed of. Right weld clamp 20 is now moved forward by its cylinder 46, as shown in FIGS. 2 and 5, on order of the operator, to locate the tube, which is still in the jaws 43 of clamp 20, in a forward position for cleaning. The end of the tube in clamp 20 is now in a position to be cleaned and deburred by the operator, if needed, and the roundness of the end insured by hand insertion of a tool having perfect roundness into the tube end.

Before the coil supply 62 of tubing 61 runs completely out and into the process 60, the process is stopped so that a stationary, trailing or tail end of tubing 61 is made available for the anneal-stretch cycle described above in connection with tube length 16 of supply 63. This trailing end of tubing 61 is now disposed and clamped in anneal clamps 12 and 14 in the manner described above in connection with tube length 16, and as shown in FIGS. 2 and 5. Again, electrical power from supply 39 is applied to the length of 61 between the anneal clamps, and the annealed length stretched in the manner described above. After the anneal and stretch operation, the tube is clamped in the left weld clamp 18 and saw clamp 56, then released from the anneal clamps. Cutting blade 50 is again operated to sever tube 61 to provide the tube with a right angle end for welding to tube 16. The left weld clamp 18 is now moved forward in its channel 45, as shown in FIG. 6, and the right weld clamp is moved to a rearward position. This clears the cut end of tube 61 for cleaning, the tube end being held by clamp 18.

The finished ends of tubes 61 and 16 are now disposed in opposed relationship to each other on table 22 by returning weld clamp 20 to a forward position on table 22. The movement of the weld clamps can be initiated by the operator by activating appropriate switches (not shown) that cause actuation of cylinders 46.

One of the weld clamps is now moved laterally to place the tube ends in abutting relationship. Such movement can be provided by mounting one of the weld clamps in a manner that permits the clamp fixture to travel a relatively small distance in a lateral direction. In FIG. 2, clamp 20 is mounted to be translated laterally by a cam surface 68 mechanically associated with and operated by movement of a lever arm or handle 69. Cam surface 68 engages the side of plate 45A of clamp 20, so that the clamp fixture is translated to the left as handle 69 is rotated in a clockwise manner.

A portable welding unit of the type described earlier, for example, can now be placed about the tubes, and at the location of their abutting interface 70 (FIG. 1), to weld the tubes together. During the welding process, the operator applies pressure to the weld interface, using cam 68, as rotated by handle 69, to translate weld clamp 20, and thus tube 16, continuously toward tube 61. In this manner, upset of tube material at the interface is effected to insure a weld of good quality. This can also be automated, using a cylinder arrangement providing constant lateral pressure on weld clamp 20.

When the welding operation is completed, cylinders 44 are actuated by the operator to release the welded tube from jaws 43 of weld clamps 18 and 20. The operator now places the welded tube in running position, in a trough (not shown) located between equipment 60 and supply 63, for example. The tube processing equipment 60 can now be restarted, the equipment of the process pulling the tube from the new supply of tubing 63. In this manner, the equipment and process of 60 are rapidly and conveniently provided with a new supply of tubing, such that the down-time of the equipment between supply changes is kept to a minimum, thereby making efficient and effective use of the equipment in the production of processed tubing.

While the invention has been described in terms of preferred embodiments, the claims appended hereto are intended to encompass all embodiments which fall within the spirit of the invention.

We claim

1. Apparatus for preparing two tubes to be welded together at their ends, and for placing the tube ends in opposed, abutting relationship for welding, the apparatus comprising means for annealing a length of each tube before the ends of the tubes are placed in abutting relationship for welding, means for stretching the length of each tube after it is annealed and while the tube is in a heated condition to insure that the length is straight for welding, means for severing an end portion from the length of each tube after it is annealed to provide two annealed tube ends for welding, means for placing and holding the annealed ends of the two tubes in abutting position to be welded together, and means for forcing the abutting ends together for welding and in a manner that will upset the material of the tube ends during welding.

2. The apparatus of claim 1 in which a portion of one of the tubes is located in equipment for processing tubing, while the other tube comprises a supply of tubing for the processing equipment.

3. The apparatus of claim 1 in which the means for annealing the lengths of tube includes two clamps adapted to grip the tube length at two spaced apart locations, and a supply of electrical current electrically connectable to the two clamps, the clamps being effective to conduct electrical current to and through the tube length.

4. The apparatus of claim 3 in which the means for severing the end portion from each tube length includes a saw located between the clamps, and means for moving the saw into engagement with the tube to saw the end portion from the tube, and for returning the saw to an out-of-the-way location after the end portion is sawn.

5. The apparatus of claim 1 in which the means for placing and holding the two tube ends in position for welding comprise two additional clamps for gripping respectively the two tubes at locations on the tubes adjacent the tube ends.

6. The apparatus of claim 5 including means to move one of the two additional clamps toward the other of the two additional clamps.

7. Apparatus for preparing the ends of two tubes to be welded together at their ends, and for placing the prepared ends in opposed, abutting relation for welding, the apparatus comprising first clamp means for gripping a length of each tube at two spaced apart locations, and for directing electrical current through the length of each tube to anneal the same, a source of electrical current connectable to the clamp means to effect annealing the length of each tube, means for relatively moving the clamp means after the length of each tube is annealed to stretch the length of tube, second clamp means for respectively gripping the two tubes at locations adjacent the ends of the tubes, and for positioning and holding the ends of the tubes in abutting relationship for welding, and means for compressing the abutting ends of the tubes together to effect upsetting of the material of the tube ends during welding.

* * * * *